US012221093B2

United States Patent
Sandrasekaran et al.

(10) Patent No.: US 12,221,093 B2
(45) Date of Patent: Feb. 11, 2025

(54) VEHICLE AND METHOD FOR LIMITING VEHICLE ROLL

(71) Applicant: Volvo Truck Corporation, Gothenburg (SE)

(72) Inventors: Ramachandran Sandrasekaran, Karnataka (IN); Nachiappan Manickam, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 306 days.

(21) Appl. No.: 17/695,565

(22) Filed: Mar. 15, 2022

(65) Prior Publication Data
US 2022/0340124 A1 Oct. 27, 2022

(30) Foreign Application Priority Data

Apr. 22, 2021 (EP) .................................... 21169940

(51) Int. Cl.
*B60W 30/04* (2006.01)
*B60R 21/00* (2006.01)
(Continued)

(52) U.S. Cl.
CPC ......... *B60W 30/04* (2013.01); *B60R 21/0132* (2013.01); *B60R 21/13* (2013.01);
(Continued)

(58) Field of Classification Search
CPC ...... B60W 30/04; B60W 10/18; B60W 10/20; B60W 50/14; B60W 2030/043;
(Continued)

(56) References Cited

U.S. PATENT DOCUMENTS 6,394,738 B1 * 5/2002 Springer ............... B62D 49/08
414/673
6,588,799 B1   7/2003 Sanchez
(Continued)

FOREIGN PATENT DOCUMENTS

DE       10360115 A1    7/2005
EP        2366592 A1    9/2011
(Continued)

OTHER PUBLICATIONS

European Search Report for European Patent Application No. 21169940, mailed Oct. 5, 2021, 3 pages.

*Primary Examiner* — Grant Moubry
*Assistant Examiner* — Ruben Picon-Feliciano
(74) *Attorney, Agent, or Firm* — Withrow & Terranova, PLLC

(57) ABSTRACT

A vehicle comprising a safety device comprising a supporting member having a first end provided with a joint part which is pivotally mounted on a side wall of the vehicle, and a second end configured to bear on the ground. The vehicle further comprises an actuator connected to the supporting member and configured to move it relative to the vehicle between an inactive position in which the supporting member is located along the vehicle side wall, with the second end at a distance from the ground, and a safety position in which the supporting member extends between the vehicle side wall and the ground, to limit vehicle roll by means of the second end bearing on the ground.

13 Claims, 2 Drawing Sheets

(51) Int. Cl.
   *B60R 21/013* (2006.01)
   *B60R 21/0132* (2006.01)
   *B60R 21/13* (2006.01)
   *B60W 10/18* (2012.01)
   *B60W 10/20* (2006.01)
   *B60W 50/14* (2020.01)
   *B62D 49/08* (2006.01)

(52) U.S. Cl.
   CPC ............ *B60W 10/18* (2013.01); *B60W 10/20* (2013.01); *B60W 50/14* (2013.01); *B62D 49/08* (2013.01); *B60R 2021/0067* (2013.01); *B60R 2021/0074* (2013.01); *B60R 2021/01306* (2013.01); *B60W 2030/043* (2013.01); *B60W 2300/10* (2013.01); *B60W 2300/125* (2013.01); *B60W 2300/145* (2013.01); *B60W 2520/18* (2013.01); *B60W 2710/18* (2013.01); *B60W 2710/20* (2013.01)

(58) Field of Classification Search
   CPC ....... B60W 2300/10; B60W 2300/125; B60W 2300/145; B60W 2520/18; B60W 2710/18; B60W 2710/20; B60R 21/0132; B60R 21/13; B60R 2021/0067; B60R 2021/0074; B60R 2021/01306; B62D 49/08; B60S 9/16; B60S 9/22

See application file for complete search history.

(56) References Cited

U.S. PATENT DOCUMENTS

| | | | |
|---|---|---|---|
| 2011/0204609 A1* | 8/2011 | Gad Elkariem | B62D 49/08 280/755 |
| 2016/0214557 A1* | 7/2016 | Villa | B62D 49/08 |
| 2023/0038742 A1* | 2/2023 | Cervantes | B60G 17/005 |

FOREIGN PATENT DOCUMENTS

| | | |
|---|---|---|
| WO | 0156866 A1 | 8/2001 |
| WO | 2015028973 A2 | 3/2015 |

\* cited by examiner

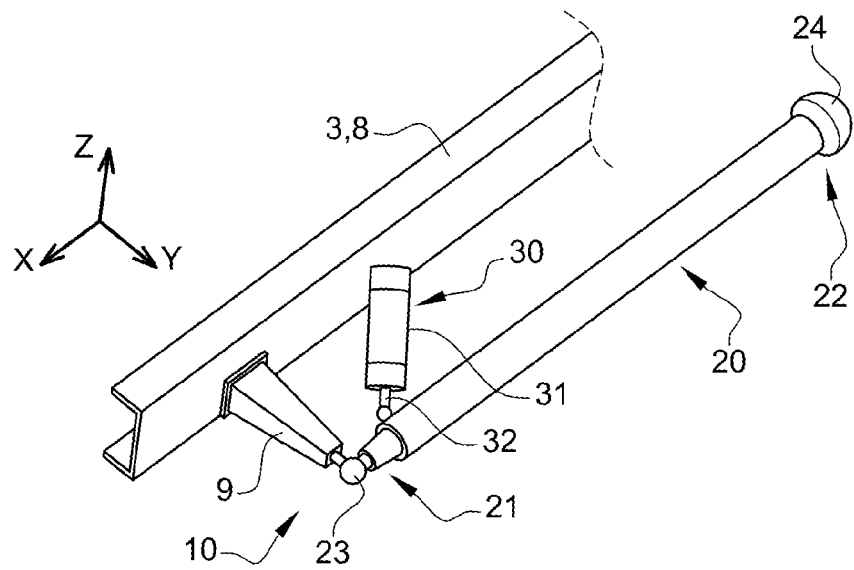
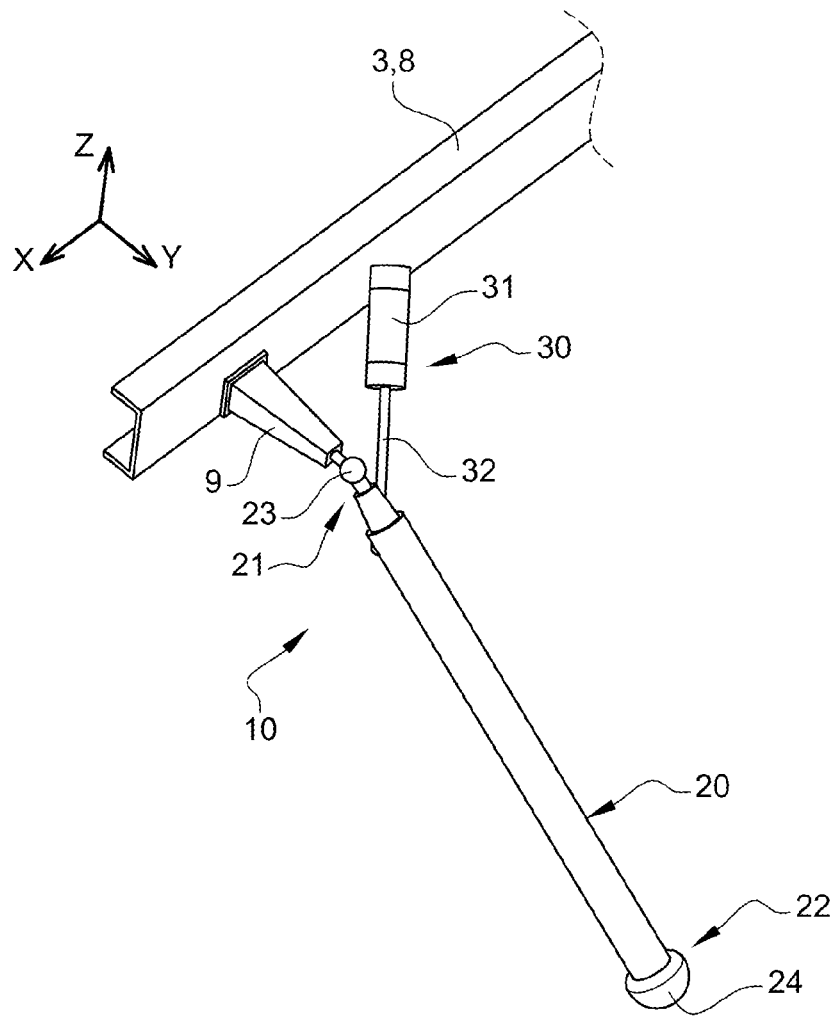

VEHICLE AND METHOD FOR LIMITING VEHICLE ROLL

RELATED APPLICATIONS

The present application claims priority to European Patent Application No. 21169940.0, filed on Apr. 22, 2021, and entitled "VEHICLE AND METHOD FOR LIMITING VEHICLE ROLL," which is incorporated herein by reference in its entirety.

FIELD OF THE DISCLOSURE

The invention relates to a vehicle comprising a safety device for limiting the vehicle roll. The invention also relates to a method for limiting the roll of such a vehicle.

The invention can be applied in light, medium and heavy-duty vehicles, such as trucks, buses and construction equipment. Although the invention will be described with respect to a truck, the invention is not restricted to this particular vehicle.

BACKGROUND

For various reasons, for example because of uneven ground, excessive speed or human error, at one point, a vehicle such as a truck may have a high roll angle. This can affect the truck balance and even lead to the vehicle rolling over.

This is obviously critical for the safety of the truck driver but also of other road users, and may cause significant damages to vehicles and road infrastructures.

Some solutions have been proposed for preventing a vehicle roll over, but they are not fully satisfactory. It therefore appears that there is room for improvement in this respect.

SUMMARY

An object of the invention is to provide a vehicle and a method for improving safety by preventing the vehicle from rolling over.

According to one aspect, the invention relates to a vehicle, in particular an industrial vehicle such as a truck, comprising a safety device which comprises:
 a supporting member having a first end provided with a joint part which is pivotally mounted on a side wall of the vehicle, and a second end configured to bear on the ground;
 an actuator connected to the supporting member and configured to move it relative to the vehicle between:
  an inactive position in which the supporting member is located along the vehicle side wall, with the second end at a distance from the ground; and a safety position in which the supporting member extends between the vehicle side wall and the ground, to limit the vehicle roll by means of the second end bearing on the ground.

Thus, owing to the invention, a rolling movement of the vehicle, i.e. an inclination around a longitudinal axis of the vehicle, may be limited by means of the supporting member when the second end thereof comes in contact with the ground. The invention allows directly preventing high lateral acceleration, which is often the cause of roll over.

The supporting member may comprise a bar which preferably extends longitudinally in the inactive position and obliquely relative to the vehicle side wall in the safety position.

The safety device may comprise a ground-bearing body mounted on the second end of the supporting member. The ground-bearing body may be dome-shaped. It can be secured to the supporting member second end. Alternatively, it could form a rolling body capable of rolling on the ground.

The vehicle may further comprise a mounting arm secured to the vehicle side wall, the joint part of the supporting member being connected to the mounting arm to form a link which provides at least one pivoting degree of freedom. In an embodiment, the link can be a ball joint link which provides three pivoting degrees of freedom.

The actuator may comprise a cylinder, such as a pneumatic or hydraulic cylinder, having one portion connected to the vehicle and one portion connected to the supporting member, preferably near the first end. In an embodiment, one portion is a barrel and one portion is a piston sliding in the barrel and equipped with a piston rod. The barrel may be secured to the vehicle side wall and the piston rod may be connected to the supporting member.

The vehicle can comprise a roll sensor and a controller capable of controlling the actuator activation if a sensed roll angle of the vehicle is above a predetermined threshold.

For example, the first end of the supporting member is mounted on a chassis of the vehicle.

According to another aspect, the invention relates to a method for limiting the roll of a vehicle as previously described. The method comprises:
 monitoring a roll angle of the vehicle;
 in case the vehicle roll angle is above a predetermined threshold, activating the actuator to move the supporting member relative to the vehicle from the inactive position to the safety position.

Thus, the safety device is automatically extended in an emergency situation, to counteract the vehicle lateral acceleration.

In case the vehicle roll angle is above a predetermined threshold, the method may further comprise:
 automatically triggering a steering correction and/or a braking action;
 and, or alternatively, sending a message to a vehicle driver for informing him of the need to undertake a steering correction and/or a braking action;
in view of improving the vehicle stability.

The message sent to the driver can be an image displayed on the dashboard and/or an audio message.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3 schematically shows a safety device according to the invention in an inactive position;

FIG. 4 schematically shows the safety device of FIG. 3 in a safety position.

DETAILED DESCRIPTION OF EXAMPLE EMBODIMENTS OF THE INVENTION

Figure 1:
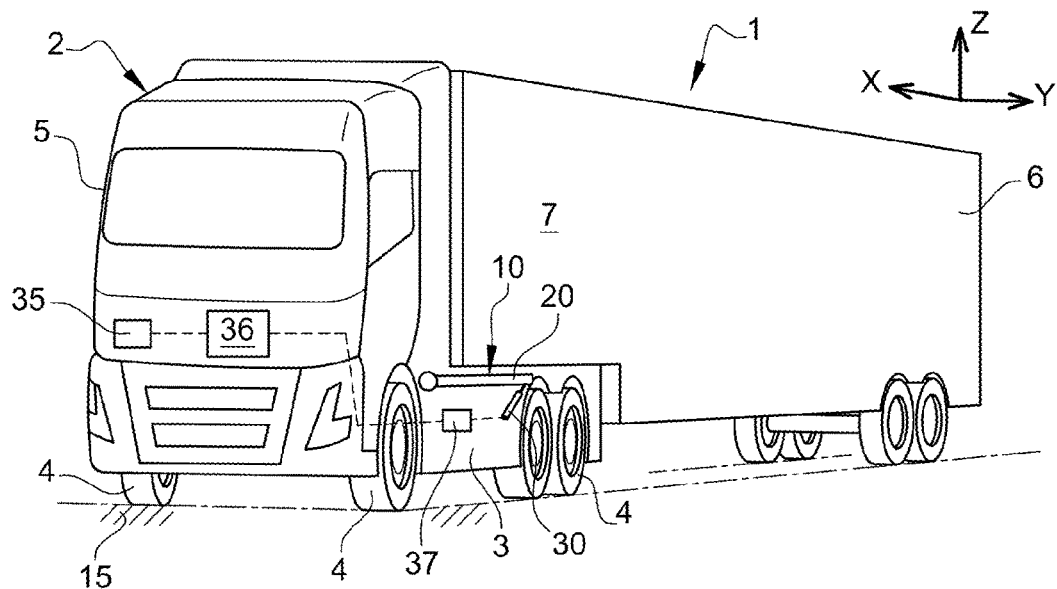
FIG. 1 is a perspective view of a vehicle comprising a safety device according to an embodiment of the invention, the vehicle being in a normal position and the safety device being in an inactive position.

FIG. 1 shows a vehicle 1, more specifically an industrial vehicle. Although the invention will be described with respect to a truck, the invention is not restricted to this particular vehicle, but may also be used in other vehicles, such as a bus.

As shown in FIG. 1, with respect to the vehicle 1 are defined the longitudinal direction X, the transversal direction Y and the vertical direction Z.

The vehicle 1 may comprise a tractor 2 including a chassis 3 supported by wheel 4 and a cab 5 which can be mounted on the chassis 2. The chassis 3 may include at least one longitudinal beam 8 (see FIGS. 3 and 4). The vehicle 1 may further comprise a trailer 6 connected to the tractor 2. The vehicle 1 has two opposite side walls 7 (only one side wall being visible in FIGS. 1 and 2).

The vehicle 1 comprises a safety device 10 which basically comprises a supporting member 20 and an actuator 30.

The supporting member 20 may comprise a bar, such as a metallic bar. The supporting member 20 has a first end 21 which is mounted on a side wall 7 of the vehicle 1, preferably on the chassis 3, and a second end 22 configured to bear on the ground 15.

The free end 21 of the supporting member 20 is provided with a joint part 23 which is pivotally mounted to the vehicle side wall 7.

In an embodiment, as shown in FIGS. 3 and 4, the vehicle 1 comprises a mounting arm 9 which is secured to the vehicle side wall 7, preferably to the chassis 3, for example to the longitudinal beam 8. The mounting arm 9 may extend transversally outwardly.

The joint part 23 of the supporting member 20 may be connected to the mounting arm 9 to form a link that is preferably a ball joint link which provides three pivoting degrees of freedom.

In an embodiment, a ground-bearing body 24 may be mounted on the second end 23 of the supporting member 20. The ground-bearing body 24 may be dome-shaped. It can be a wearing part or sacrificial part which can be removed and replaced by a new ground-bearing body 24 when needed. For example, the ground-bearing body 24 can be made of brass or steel.

In FIGS. 1 and 3, the supporting member 20 is in an inactive position. In this inactive position, the supporting member 20 is located along the vehicle side wall 7, with the second end 22 at a distance from the ground 15. In an embodiment, the supporting member 20 may extend longitudinally in the inactive position. It has to be noted that, in FIG. 1, the first end 21 of the supporting member 20 is located at the back, while in FIG. 3 the first end 21 of the supporting member 20 is located at the front. Both arrangements are possible.

Figure 2:
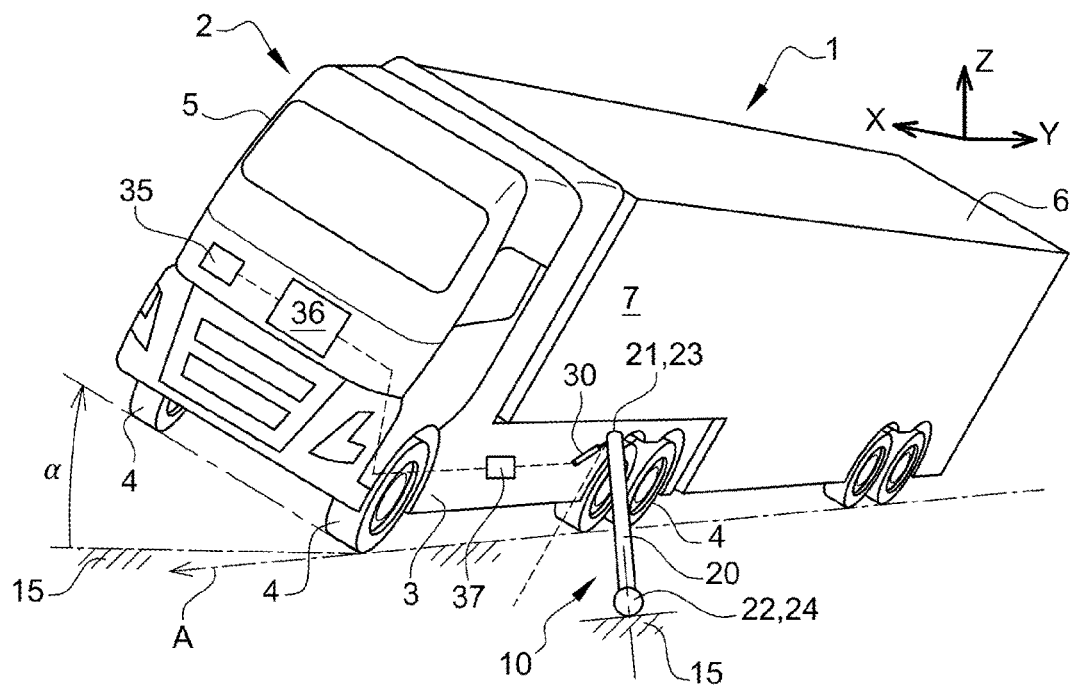
FIG. 2 is a perspective view of the vehicle of FIG. 1, the vehicle having a rolling angle above a predetermined threshold so that the safety device has been moved to a safety position.

The actuator 30 is connected to the supporting member 20 and configured to move it relative to the vehicle 1 from the inactive position towards a safety position illustrated in FIGS. 2 and 4. In the safety position, the supporting member 20 extends between the vehicle side wall 7 and the ground 15, preferably obliquely relative to the vehicle side wall 7. Owing to the second end 22 which bears on the ground 15, the supporting member 20 allows limiting the vehicle roll as will be explained in more details.

An embodiment of the actuator is illustrated in FIGS. 3 and 4. The actuator 30 may comprise a pneumatic or hydraulic cylinder having a barrel 31 and a piston rod 32 secured to a piston sliding in the barrel 31. The barrel 31 can be connected to the vehicle 1, typically to the longitudinal beam 8 of the chassis 3, and the piston rod 32 can be connected to the supporting member 20, preferably near the first end 21. The opposite layout can also be envisaged. Thus, a movement of the piston rod 32 directed outwardly of the barrel 31 results in the supporting member 20 being moved from its inactive position towards its safety position.

As schematically illustrated in FIG. 1, the vehicle 1 may also comprise a roll sensor 35 connected to a controller 36, such as an electronic control unit (ECU).

The roll sensor 35 monitors the roll angle α of the vehicle 1.

As shown in FIG. 2, a situation can occur in which the vehicle 1 is inclined around a rolling axis A that is oriented longitudinally and includes the contact areas of the left wheels 4 with the ground 15, while the right wheels 4 are above the ground.

If the sensed roll angle α is above a predetermined threshold, the controller 36 controls the activation of the actuator 30, which results in the supporting member 20 moving relative to the vehicle 1 from the inactive position (FIGS. 1 and 3) to the safety position (FIGS. 2 and 4).

The predetermined threshold can be in the range of 5° to 45°.

For example, there may be provided a solenoid valve 37 controlled by the controller 36 and capable of activating the actuator 30.

The safety device 10 is configured to prevent the vehicle roll over from happening and its constituent parts are dimensioned accordingly. For example, the supporting member 20 can be designed so that, in the safety position, the inclination (i.e. rolling angle α) of the vehicle 1 around the rolling axis A is less than 5°.

In order to prevent roll over in both sides, the vehicle 1 preferably comprises a safety device 10 mounted on each side wall 7. In an embodiment, each supporting member 20 is actuated by a dedicated actuator 30 activated by a dedicated solenoid valve 37. The controller 36 controls the appropriate safety device 10 depending on the sign of the roll angle α sensed by the roll sensor 35.

It is to be understood that the present invention is not limited to the embodiments described above and illustrated in the drawings; rather, the skilled person will recognize that many changes and modifications may be made within the scope of the appended claims.

The invention claimed is:

1. A vehicle comprising at least one safety device, the at least one safety device comprising:
   a supporting member having a first end provided with a joint part which is pivotally mounted on a vehicle side wall of the vehicle, and a second end configured to bear on the ground;
   a mounting arm secured to the vehicle side wall, wherein the joint part of the supporting member is connected to the mounting arm to form a ball joint link which provides three pivoting degrees of freedom; and
   an actuator connected to the supporting member and configured to move the supporting member relative to the vehicle between:
   an inactive position in which the supporting member is located along the vehicle side wall, with the second end at a distance from the ground; and a safety position in which the supporting member extends between the vehicle side wall and the ground, to limit vehicle roll by means of the second end bearing on the ground.

2. The vehicle of claim 1, wherein the supporting member comprises a bar which extends longitudinally in the inactive position and obliquely relative to the vehicle side wall in the safety position.

3. The vehicle of claim 1, wherein the at least one safety device comprises a ground-bearing body mounted on the second end of the supporting member.

4. The vehicle of claim 3, wherein the ground-bearing body is dome-shaped.

5. The vehicle of claim 1, wherein the actuator comprises:
a cylinder, wherein the cylinder is a pneumatic cylinder or a hydraulic cylinder,
wherein the cylinder has one portion connected to the vehicle and another portion connected to the supporting member near the first end.

6. The vehicle of claim 1, further comprising:
a roll sensor, and
a controller capable of controlling activation of the actuator if a sensed roll angle of the vehicle is above a predetermined threshold.

7. The vehicle of claim 1, wherein the first end of the supporting member is mounted on a chassis of the vehicle.

8. The vehicle of claim 1, wherein the at least one safety device comprises a first safety device mounted to a first vehicle side wall, and comprises a second safety device mounted to a second vehicle side wall that opposes the first vehicle side wall.

9. A method for limiting roll of a vehicle comprising a safety device including (i) a supporting member having a first end provided with a joint part which is pivotally mounted on a vehicle side wall of the vehicle, and a second end configured to bear on the ground, (ii) a mounting arm secured to the vehicle side wall, wherein the joint part of the supporting member is connected to the mounting arm to form a ball joint link which provides three pivoting degrees of freedom, and (iii) an actuator connected to the supporting member and configured to move the supporting member relative to the vehicle, the method comprising the steps of:
monitoring a roll angle of the vehicle; and
if the monitored vehicle roll angle is above a predetermined threshold, activating the actuator to move the supporting member relative to the vehicle from (a) an inactive position in which the supporting member is located along the vehicle side wall, with the second end at a distance from the ground, to (b) a safety position in which the supporting member extends between the vehicle side wall and the ground, to limit vehicle roll by means of the second end bearing on the ground.

10. The method of claim 9, further comprising, if the monitored vehicle roll angle is above a predetermined threshold, automatically triggering a steering correction and/or a braking action in order to improve vehicle stability.

11. The method of claim 9, further comprising, if the monitored vehicle roll angle is above a predetermined threshold, sending a message informing a vehicle driver of the need to undertake a steering correction and/or a braking action in order to improve vehicle stability.

12. The method of claim 9, wherein the safety device comprises a ground-bearing body mounted on the second end of the supporting member.

13. The method of claim 12, wherein the ground-bearing body is dome-shaped.

* * * * *